(12) United States Patent
Khatri et al.

(10) Patent No.: US 11,979,263 B2
(45) Date of Patent: May 7, 2024

(54) METHOD AND WIRE-LINE TRANSCEIVER FOR PERFORMING SERIAL LOOP BACK TEST

(71) Applicant: Samsung Electronics Co., Ltd., Suwon-si (KR)

(72) Inventors: Vishal Khatri, Bengaluru (IN); Tamal Das, Bengaluru (IN); Umamaheswara Reddy Katta, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/872,258

(22) Filed: Jul. 25, 2022

(65) Prior Publication Data
US 2023/0283503 A1  Sep. 7, 2023

(30) Foreign Application Priority Data
Mar. 3, 2022  (IN) .............................. 202241011428

(51) Int. Cl.
*H04L 25/03* (2006.01)
*H04B 3/06* (2006.01)
*H04B 17/14* (2015.01)

(52) U.S. Cl.
CPC ......... *H04L 25/03878* (2013.01); *H04B 3/06* (2013.01); *H04B 17/14* (2015.01)

(58) Field of Classification Search
CPC ......... H04L 25/03044; H04L 25/03063; H04L 25/03095; H04L 25/0314; H04L 25/03878; H04L 2025/03509; H04L 2025/03515; H04B 17/14; H04B 3/06

USPC .......................................................... 375/221
See application file for complete search history.

(56) References Cited

U.S. PATENT DOCUMENTS

| | | | | |
|---|---|---|---|---|
| 5,377,226 A * | 12/1994 | Davis | ................... | H04B 1/7103 375/234 |
| 5,414,733 A * | 5/1995 | Turner | .............. | H04L 25/03057 708/319 |
| 6,687,292 B1 * | 2/2004 | Garcia | ...................... | H04L 7/10 375/234 |
| 7,047,457 B1 * | 5/2006 | Black | ..................... | H04B 17/15 714/712 |

(Continued)

FOREIGN PATENT DOCUMENTS

JP            6679635 B2      4/2020

OTHER PUBLICATIONS

Boesch, Ryan, "Signal Preconditioning Using Feedforward Equalizers in ADC-Based Data Links," A Dissertation Submitted to the Department of Electrical Engineering and the Committee on Graduate Studies of Stanford University, May 2016.

*Primary Examiner* — James M Perez
(74) *Attorney, Agent, or Firm* — Muir Patent Law, PLLC

(57) ABSTRACT

A wire-line transceiver is configured to perform a serial loop back test. The wire-line transceiver includes an on-chip transmitter, an on-chip receiver and a fractional feed forward equalizer circuit (fractional FFE circuit) in a serial loop back line path between the on-chip transmitter and the on-chip receiver. The fractional FFE circuit is configured to induce a delay one of less than one symbol time of data, for enhancing an eye opening from the serial loop back line during the serial loop back test, compared to a situation where the fractional FFE circuit is not present or is not used.

10 Claims, 7 Drawing Sheets

(56) References Cited

U.S. PATENT DOCUMENTS

| | | | |
|---|---|---|---|
| 7,259,592 B2* | 8/2007 | Lee | H03K 19/018585 326/86 |
| 7,379,495 B2* | 5/2008 | Yu | H04L 25/03057 375/232 |
| 7,688,106 B1* | 3/2010 | Shumarayev | H03K 19/17744 326/82 |
| 7,715,836 B2* | 5/2010 | Vassiliou | H04B 17/20 455/67.11 |
| 7,778,368 B2* | 8/2010 | Vandewiele | H04L 25/0242 375/267 |
| 7,949,041 B2* | 5/2011 | Zerbe | H01L 29/66795 375/221 |
| 7,952,376 B1* | 5/2011 | Yu Kasnavi | G01R 31/31715 324/750.01 |
| 8,081,723 B1* | 12/2011 | Ding | H04L 1/205 327/147 |
| 8,184,686 B2* | 5/2012 | Wall | H03L 7/08 375/232 |
| 8,705,605 B1* | 4/2014 | Raman | H04L 1/243 375/220 |
| 9,065,537 B2* | 6/2015 | Georgantas | H04B 17/14 |
| 9,184,857 B2* | 11/2015 | Vassiliou | H04B 17/20 |
| 9,722,822 B1* | 8/2017 | Zhang | H04L 25/03343 |
| 9,800,438 B1* | 10/2017 | Zhang | H04L 25/03885 |
| 9,813,190 B1* | 11/2017 | Sutskover | H03F 1/3247 |
| 10,243,762 B1* | 3/2019 | Kadkol | H04L 7/0041 |
| 10,447,254 B1* | 10/2019 | Kadkol | H03K 5/135 |
| 10,547,475 B1* | 1/2020 | Gagnon | H04L 25/03057 |
| 11,038,768 B1* | 6/2021 | Madrigal | H04L 25/03057 |
| 11,128,497 B1* | 9/2021 | Sun | H04L 25/03267 |
| 11,153,129 B1* | 10/2021 | Toprak-Deniz | H04L 25/03044 |
| 11,177,986 B1* | 11/2021 | Ganesan | H04L 25/03878 |
| 11,309,876 B2* | 4/2022 | Doppalapudi | H04J 3/062 |
| 11,356,302 B1* | 6/2022 | Sun | H04L 25/03057 |
| 11,594,296 B2* | 2/2023 | Zhao | G11C 29/38 |
| 11,611,426 B2* | 3/2023 | Kunchapu | H04L 7/0054 |
| 2002/0057713 A1* | 5/2002 | Bagchi | H04L 1/1883 370/522 |
| 2003/0016770 A1* | 1/2003 | Trans | H04B 3/32 375/346 |
| 2003/0189997 A1* | 10/2003 | Shanbhag | H04L 25/03878 375/348 |
| 2004/0091040 A1* | 5/2004 | Shanbhag | H03H 21/0012 375/234 |
| 2007/0297537 A1* | 12/2007 | Luce | H04L 27/38 375/322 |
| 2008/0240212 A1* | 10/2008 | Satou | H04L 1/24 714/704 |
| 2009/0304054 A1* | 12/2009 | Tonietto | H04L 25/03343 375/221 |
| 2014/0164861 A1* | 6/2014 | Wall | H04B 17/00 714/733 |
| 2015/0162922 A1* | 6/2015 | Song | H04L 7/0091 375/376 |
| 2016/0344358 A1* | 11/2016 | Oliaei | H03G 5/165 |
| 2019/0044760 A1* | 2/2019 | Chiang | H04L 25/03343 |
| 2020/0025824 A1* | 1/2020 | Zhao | G11C 29/022 |
| 2020/0027518 A1* | 1/2020 | Caraher | G11C 29/38 |
| 2020/0151076 A1* | 5/2020 | Lacroix | G01R 31/2884 |
| 2022/0012140 A1* | 1/2022 | Das Sharma | G06F 11/1471 |
| 2022/0163588 A1* | 5/2022 | Froelich | G01R 31/30 |
| 2023/0018015 A1* | 1/2023 | Chandra | G01R 31/083 |
| 2023/0130236 A1* | 4/2023 | Song | H04B 1/18 455/552.1 |
| 2023/0194608 A1* | 6/2023 | Reddy | G01R 31/3187 714/733 |
| 2023/0258716 A1* | 8/2023 | Choudhary | G01R 31/31915 716/136 |
| 2023/0283503 A1* | 9/2023 | Khatri | H04B 3/06 375/376 |

* cited by examiner

Eye-width : 33.4ps

Eye-width : 31.8 ps

METHOD AND WIRE-LINE TRANSCEIVER FOR PERFORMING SERIAL LOOP BACK TEST

CROSS-REFERENCE TO RELATED APPLICATIONS

This application claims priority to Indian Patent Application No. 202241011428 filed on Mar. 3, 2022 in the Indian Patent Office, the contents of which are incorporated by reference in their entirety herein.

FIELD OF INVENTION

The present disclosure relates to transceivers, and more particularly to a method and a wire-line transceiver for performing a serial loop back test using a fractional feed forward equalizer.

BACKGROUND

In general, a serializer/de-serializer (SerDes) is used in high speed communications to compensate for limited input/output. The SerDes converts data between serial data and parallel interfaces in each direction. A serial loopback (SLB) test can verify operation of serial communication by sending and receiving data from the same serial port. The SLB test is performed to identify problems in the serial port, a cable, or code, generating messages without having to connect to a third-party hardware.

As a speed of SerDes link increases, the internal SLB testing becomes challenging without the use of complex Inter Symbol Interference (ISI) equalization circuits in a transmit path. Generally, as the speed of the SerDes link increases, the SLB testing is performed by an increasing number of inverters in the transmit path. However, the increase in the number of inverters in the transmit path leads to high power consumption and increased sensitivity to power supply induced jitter (PSIJ), and also occupies a large area in the SerDes. Generally, SLB nets are bandwidth limited nets owing to the length of routing and speed of operation. The ISI can cause bit errors at the receiver end leading to improper bad classification of a good component. Thus, it is desired to address the above-mentioned disadvantages or other shortcomings and/or provide a useful alternative.

SUMMARY

Embodiments described herein provide a method and a wire-line transceiver for performing a serial loop back test using a fractional feed forward equalizer in a serial loop line path between an on-chip transmitter and an on-chip receiver. In some embodiments, the fractional feed forward equalizer induces a delay within one symbol time of data which enhances an eye opening in the serial loop back line during the serial loop back test. The fractional feed forward equalizer may be implemented using a simple invertor and a transmission gate with minimal area overhead and that is cost effective.

According to some embodiments, a wire-line transceiver for performing a serial loop back test includes an on-chip transmitter, an on-chip receiver, and a fractional feed forward equalizer circuit (fractional FFE circuit) in a serial loop back line path between the on-chip transmitter and the on-chip receiver. The fractional FFE circuit is configured to induce a delay of less than one symbol time of data, for enhancing an eye opening from the serial loop back line during the serial loop back test, compared to a situation where the fractional FFE circuit is not present or is not used.

In an embodiment, the fractional FFE circuit comprises an inverter and a transmission gate.

In an embodiment, the delay within one symbol time enhances the eye opening from the serial loop back line by minimizing Inter Symbol Interference (ISI).

Accordingly, aspects of the embodiments herein include a method for performing a serial loop back test in a wire-line transceiver. The method may include sending, by an on-chip transmitter of the wire-line transceiver, data to an on-chip receiver for performing the serial loop back test, and inducing, by a fractional feed forward equalizer circuit (fractional FFE circuit) of the wire-line transceiver, a delay of less than one symbol time of data, thereby enhancing an eye opening from a serial loop back line during the serial loop back test, compared to a situation where the fractional FFE circuit is not present or is not used. Further, the method may include performing, by the wire-line transceiver, the serial loop back test with the enhanced eye opening from the serial loop back line.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

Aspects of the invention are illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
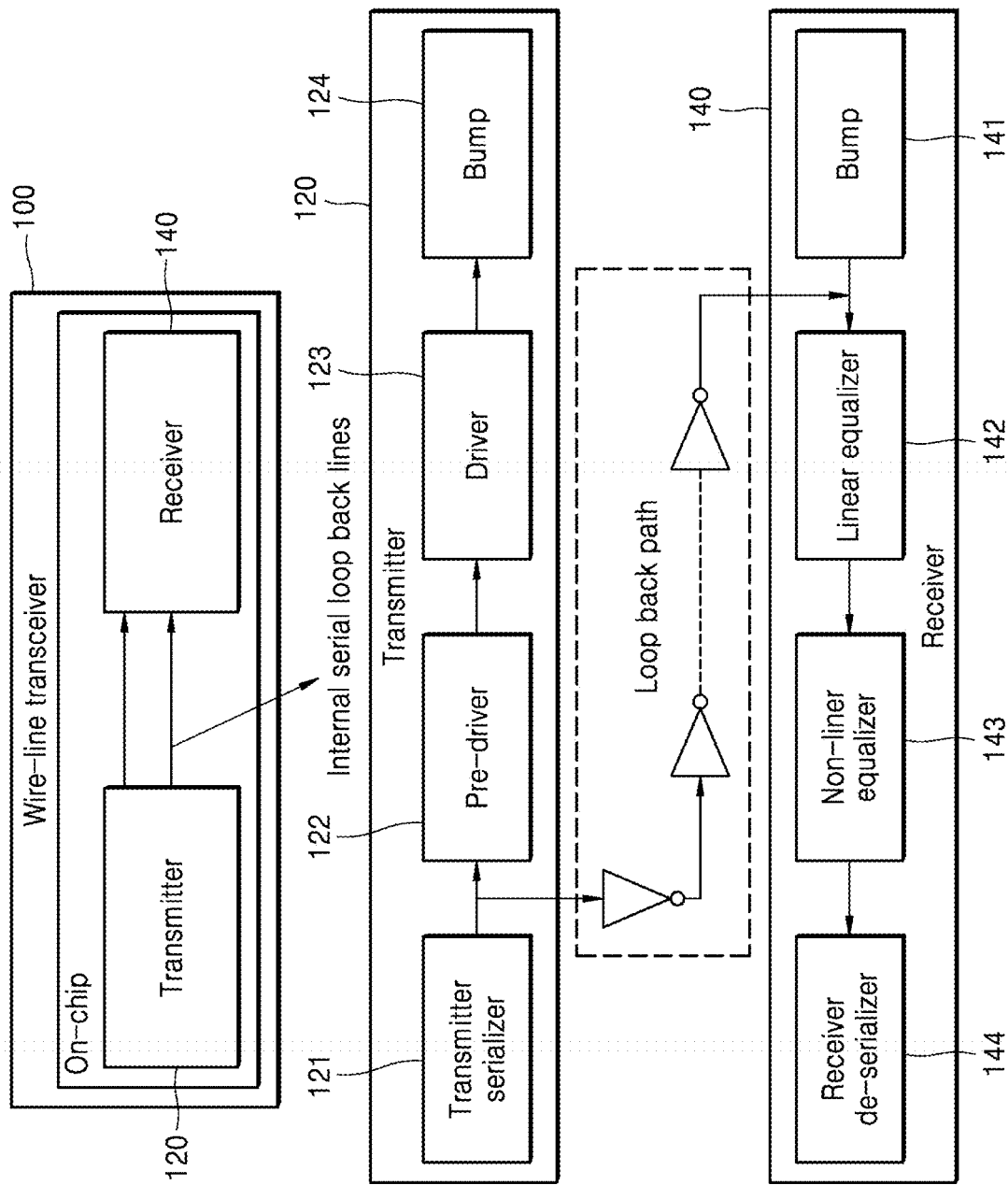
FIG. 1 illustrates a wire-line transceiver for performing a serial loop back test, according to some embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited to any particular ordinal relationship by these terms, unless the context so clearly indicates. These terms are generally only used to distinguish one element from another.

Accordingly, embodiments herein disclose a wire-line transceiver for performing a serial loop back test. The wire-line transceiver may include an on-chip transmitter, an on-chip receiver, and a fractional feed forward equalizer (frac. FFE, also described as a fractional FFE circuit) in a serial loop back line path between the on-chip transmitter and the on-chip receiver. In some embodiments, the fractional FFE is configured to induce a delay within one symbol time of data (e.g., less than and within one symbol time, or a fraction of one symbol time, or stated differently, a delay having a time greater than zero and less than one symbol time), for enhancing an eye opening from the serial loop back line during the serial loop back test. The on-chip devices (e.g., receiver and transmitter) may be formed as part of an integrated circuit included in a semiconductor chip or semiconductor package. For example, a semiconductor chip may be a die formed from a wafer and having an integrated circuit formed thereon, and a semiconductor package may include one or more semiconductor chips formed on a package substrate and covered by an encapsulation layer. The fractional FFE may be an on-chip device as well.

Accordingly, embodiments herein disclose a method for performing a serial loop back test in a wire-line transceiver. The method may include sending, by an on-chip transmitter of the wire-line transceiver, data to an on-chip receiver for performing the serial loop back test and inducing, by a fractional feed forward equalizer (Frac. FFE) of the wire-line transceiver, a delay within one symbol time of data, for enhancing an eye opening from a serial loop back line during the serial loop back test. Further, the method may include performing, by the wire-line transceiver, the serial loop back test with the enhanced eye opening from the serial loop back line.

In the conventional methods and wire-line transceivers, the transmit side serial loop back paths are implemented rather simplistically but are generally long due to floor planning and segregation of receiver and transmitter.

In the conventional methods and wire-line transceivers, a large number of buffers are used to transmit signals from the transmitter to the receiver. As a result, the wire-line transceiver is susceptible to self-induced noise which leads to eye closure before receiver equalization can help. Further, the use of a large number of buffers makes the wire-line transceiver consume high power and may require IR (signal integrity (SI)) drop planning.

Unlike to the conventional methods and wire-line transceivers, wire-line transceivers according to aspects of the disclosed embodiments comprise a fractional FFE implemented using a simple inverter and a transmission gate (as a resistor). These example wire-line transceivers may perform equalization techniques with minimal overhead.

Unlike to the conventional methods and wire-line transceivers, in wire-line transceivers according to aspects of the disclosed embodiments, the frac. FFE extends the bandwidth of an ISI limited net more than a regular FFE.

Unlike to the conventional methods and wire-line transceivers, wire-line transceivers according to aspects of the disclosed embodiments can comfortably provide a sufficient eye-opening for the SLB lines across various conditions. Further, flexible control and the simple structure of the proposed wire-line transceiver SLB path makes it easy to communicate across multiple technologies.

Unlike the conventional methods and wire-line transceivers, wire-line transceivers according to aspects of the disclosed embodiments may have a simple design with no additional area impact.

Reference is now made to the drawings and more particularly to FIGS. 1 through 6B, where similar reference characters denote corresponding features consistently throughout the figures.

FIG. 1 illustrates a wire-line transceiver (100) for performing a serial loop back test, according to the embodiments as disclosed herein. Referring to the FIG. 1, the wire-line transceiver (100) includes an on-chip transmitter (120) and an on-chip receiver (140).

The on-chip transmitter (120) includes transmitter serializer (121), a pre-driver (122), a driver (123) and a bump (124). The on-chip receiver (140) includes a bump (141), a linear equalizer (142), a non-linear equalizer (143) and a receiver de-serializer (144). Circuitry and operation of the transmitter serializer (121), the pre-driver (122), the driver (123), the linear equalizer (142), the non-linear equalizer (143), and the receiver de-serializer (144), are well-known for wire-line transceivers, and are not discussed in further detail herein. Bump (124) and bump (141) refer to conductive connection terminals, for example for outputting or inputting signals to the outside or from the outside of the wire-line transceiver 100, which may be in the form of conductive bumps. There is a serial loop back (SLB) path between the on-chip transmitter (120) and the on-chip receiver (140). The SLB path may include, for example, a series of inverters. According to various embodiments, the SLB path is activated only during a test mode of the wire-line transceiver (100). The SLB test is performed along the SLB path to verify operation of serial communication by sending and receiving data internally within the chip. The SLB test is performed to identify issues in the serial port, cable, or a code, generating messages without having to connect to a third-party hardware. As the speed of data transmission along the SLB path increases, the internal SLB testing becomes difficult with increased numbers of ISI equalization circuits in the SLB path.

Aspects of the disclosed embodiments address the above mentioned issues associated with the SLB testing by introducing a fractional feed forward equalizer (Frac. FFE) (160) in the SLB path between the on-chip transmitter (120) and the on-chip receiver (140). Further, the frac. FFE (160) also helps in enhancing the efficacy of the SLB test path, and the efficacy increases with increase in the data rate which is not provided by any existing mechanism.

Figure 2A:
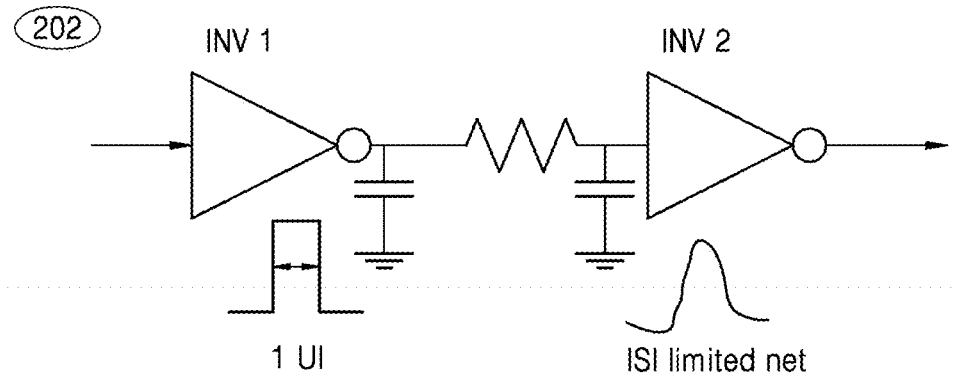
FIGS. 2A and 2B are schematic circuit diagrams of a fractional feed forward equalizer (frac. FFE) in a serial loop line path of the wire-line transceiver, according to some embodiments as disclosed herein.
Figure 2B:
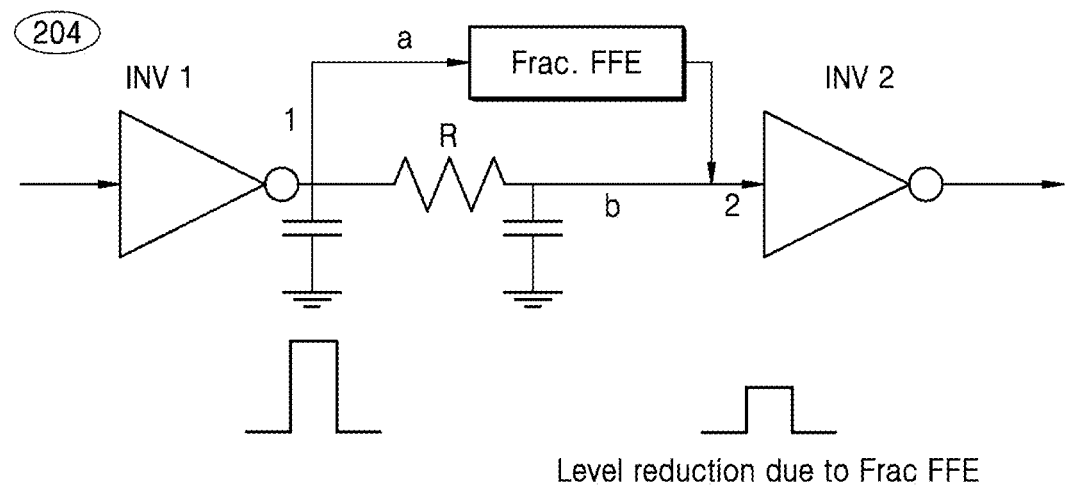

FIGS. 2A and 2B are schematic circuit diagrams comparing a conventional SLB path to an SLB path using a frac. FFE in the wire-line transceiver (100), according to some embodiments as disclosed herein. Referring to FIG. 2A, at 202, a conventional series invertor used in the SLB path for performing the SLB testing is depicted. A first invertor (INV1) provides data at a unit interval (1 UI) and a second invertor (INV2) outputs the ISI limited net, as shown in FIG. 2A. Here, 1 UI=1/data rate. The SLB test sends full rate data to the on-chip receiver (140) from the on-chip transmitter (120). The INV1 drives data to the INV2. In FIG. 2B, according to one embodiment, the frac. FFE (160) is provided between the INV1 and the INV2. The inverter delay acts a fractional delay of the UI and it results in the opposite polarity signal at the input of the INV2. A conventional FFE will provide the delay via a flipflop which typically requires additional clock routing.

Referring to FIG. 2B, at 204, an example location of the frac. FFE (160) between the INV1 and the INV2 is shown. The frac. FFE (160) provides the delay within one symbol time of the data, for enhancing an eye opening from the SLB line during the SLB test (e.g., compared to a situation where the frac. FFE (160) is not present or is not used). For example, if one symbol takes a particular amount of time to be output from transmitter serializer 121, frac. FFE (160) will provide a delay up to that amount of time. Therefore, at point 1 in FIG. 2B, there is a stream of data running at the data rate. At point 2, there is another stream of data which is delayed or forwarded by a fraction of less than 1 UI if certain constraints are met. For example, a delay of 41 pico seconds may be used. In this case, at point 2, the data is inverted in polarity with a reduction in amplitude due to a resistor used in the frac. FFE (160). Further, equalization is achieved by merging both the paths (the path "a" passing through the frac. FFE (160) and the path "b" passing through the resistor R, which leads to subtraction of voltages at point 2 (e.g., voltage from path "a" subtracted from voltage from path "b").

Figure 3:
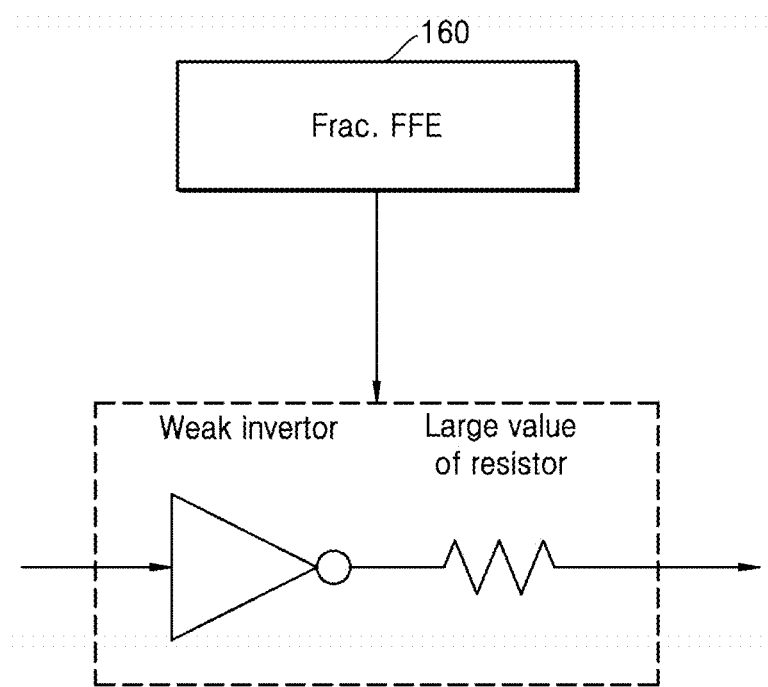
FIG. 3 is an example illustrating an implementation of the fractional feed forward equalizer (frac. FFE) in the serial loop line path of the wire-line transceiver, according to some embodiments as disclosed herein.

FIG. 3 is an example illustrating an implementation of the frac. FFE (160) in the serial loop back line path of the wire-line transceiver (100), according to some embodiments as disclosed herein. The FIG. 3 illustrates the implementation of the frac. FFE (160). In an example, the frac. FFE (160) is implemented using a weak invertor, and a transmission gate, which implements a large value resistor. For example, the value of resistor may be for amplitude scaling only.

The inverter and the resistor combination is used as an example, and the invention is not limited as such. However, other combinations of components which can achieve a delay below the 1 UI can be used for the implementation of the frac. FFE (160). As shown, the frac. FFE (160) is connected in parallel with the resistor R, and is connected in series between two consecutive inverters (INV 1 and INV 2) of the serial loop back line.

Figure 4A:
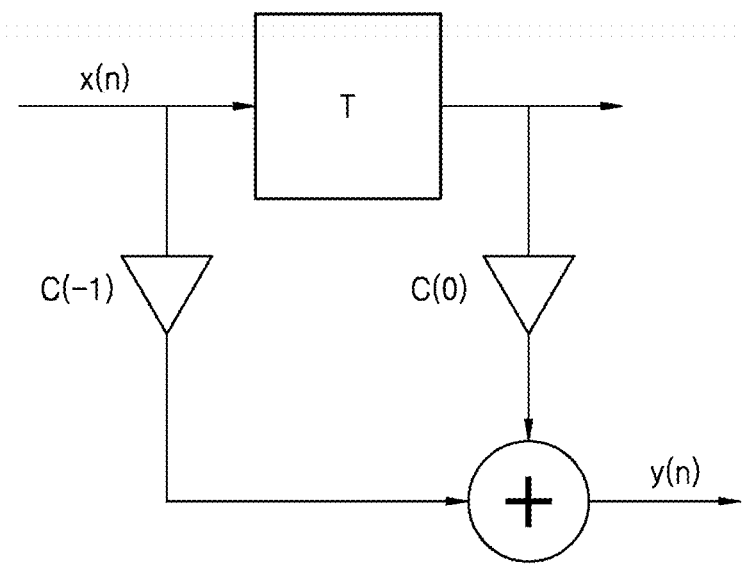
FIG. 4A is a block diagram of a regular FFE in the serial loop line path of the wire-line transceiver, according to the prior art.

FIG. 4A is a block diagram of a regular FFE in the serial loop back line path of the wire-line transceiver (100), according to the prior art.

Referring to the FIG. 4A, a simple two tap regular FFE is provided. Consider that input data is X (n) with a data rate of C (−1). Here, the delay in the data (T) is UI. The delayed data rate is C(0) which is merged with the data rate of C (−1) to obtain Y (n) as output. The regular FFE works very well for the main functional path but for the SLB test path where the aim is to reduce circuit complexity there are two issues which are encountered with the use of the regular FFE. The first issue is generation of the UI spaced data requires additional flip flops and clocks which can lead to timing issues. The second issue is that the regular FFE acts only on the UI spaced data and hence the regular FFEs may not be needed at all.

Figure 4B:
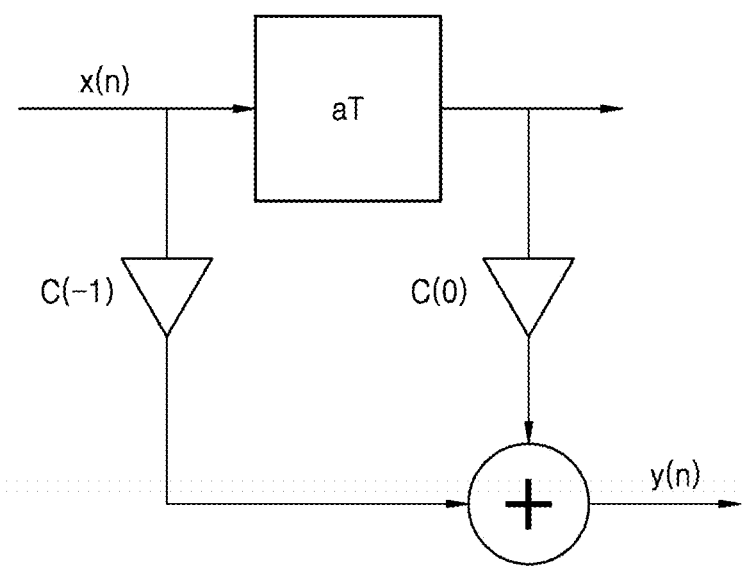
FIG. 4B is a block diagram of the frac. FFE in the serial loop line path of the wire-line transceiver, according to some embodiments as disclosed herein.

FIG. 4B is a block diagram of the frac. FFE (160) in the serial loop back line path of the wire-line transceiver, according to the embodiments as disclosed herein. Referring to the FIG. 4B in conjunction with the FIG. 4A, the frac. FFE (160) comprises a tap providing a delay of aT to the data, where 'a' is delay factor which is <1. Therefore, the data rate of the C(0) is aT which is a fraction of the delay introduced by the regular FFE T (UI). In the regular FFE, a=1 which is achieved using the flip flops and the clocks. But a<1 can be achieved using the simple invertor and the transmission gate.

Therefore, the proposed frac. FFE (160) provides the advantages such as delay generation through the inverter itself which alleviates the need for sending a dedicated clock to the SLB path. The area overhead is minimal in the proposed frac. FFE (160) as the requirement of the multiple flip flops and clocks are eliminated. Also, there is minimized complexity of the SLB test path and minimized cost of the SLB test path.

Figure 5:
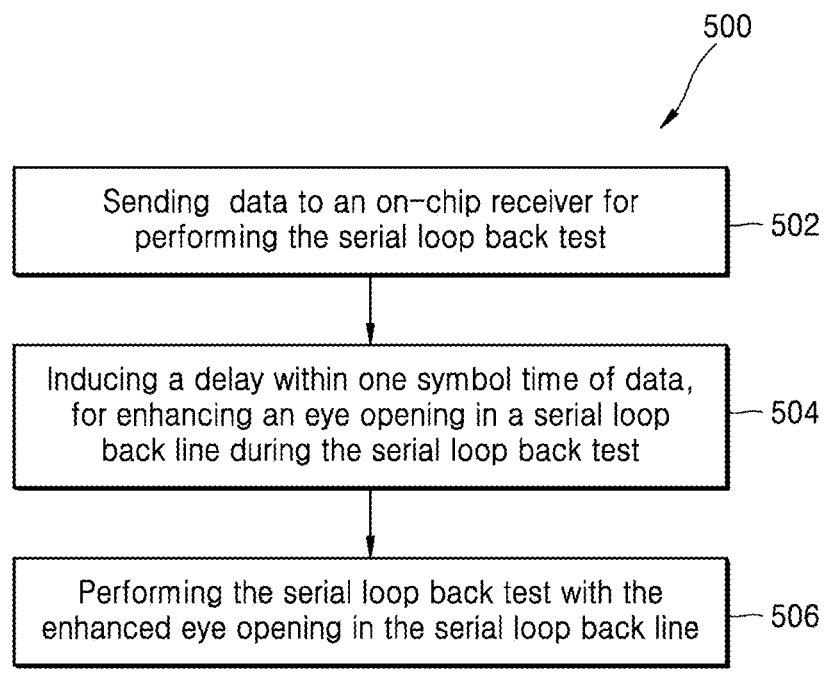
FIG. 5 is a flow chart illustrating a method for performing the serial loop back test in the wire-line transceiver, according to some embodiments as disclosed herein.

FIG. 5 is a flow chart (500) illustrating a method for performing the serial loop back test in the wire-line transceiver (100), according to the embodiments as disclosed herein.

Referring to the FIG. 5, at step 502, the method includes the wire-line transceiver (100) sending data to the on-chip receiver (140) for performing the serial loop back test. For example, in the wire-line transceiver (100) illustrated in the FIG. 2, the on-chip transmitter (120) is configured to send data to the on-chip receiver (140) for performing the serial loop back test.

At step 504, the method includes the wire-line transceiver (100) inducing the delay within one symbol time of data, for enhancing the eye opening from the SLB line during the SLB test. For example, in the wire-line transceiver (100) illustrated in the FIG. 2, the frac. FFE (160) is configured to induce the delay within one symbol time of data, for enhancing the eye opening from the SLB line during the SLB test.

At step 506, the method includes the wire-line transceiver (100) performing the SLB test with the enhanced eye opening from the SLB line. For example, in the wire-line transceiver (100) illustrated in the FIG. 2, the frac. FFE (160) is configured to perform the SLB test with the enhanced eye opening from the SLB line.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 6A:
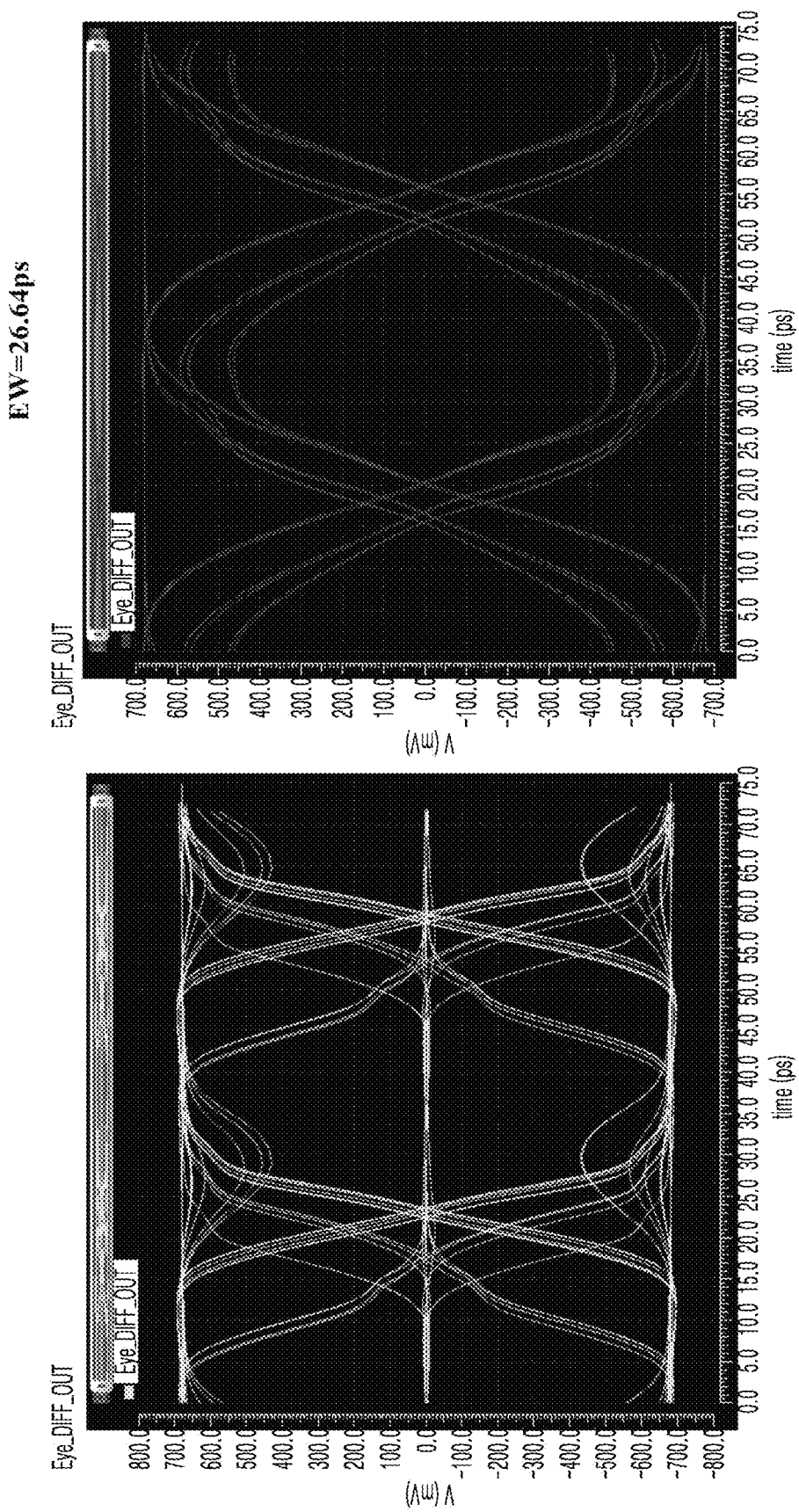
FIGS. 6A-6B are simulation diagrams illustrating an enhancement of an eye opening due to the frac. FFE in the serial loop back line, according to some embodiments as disclosed herein.
Figure 6B:
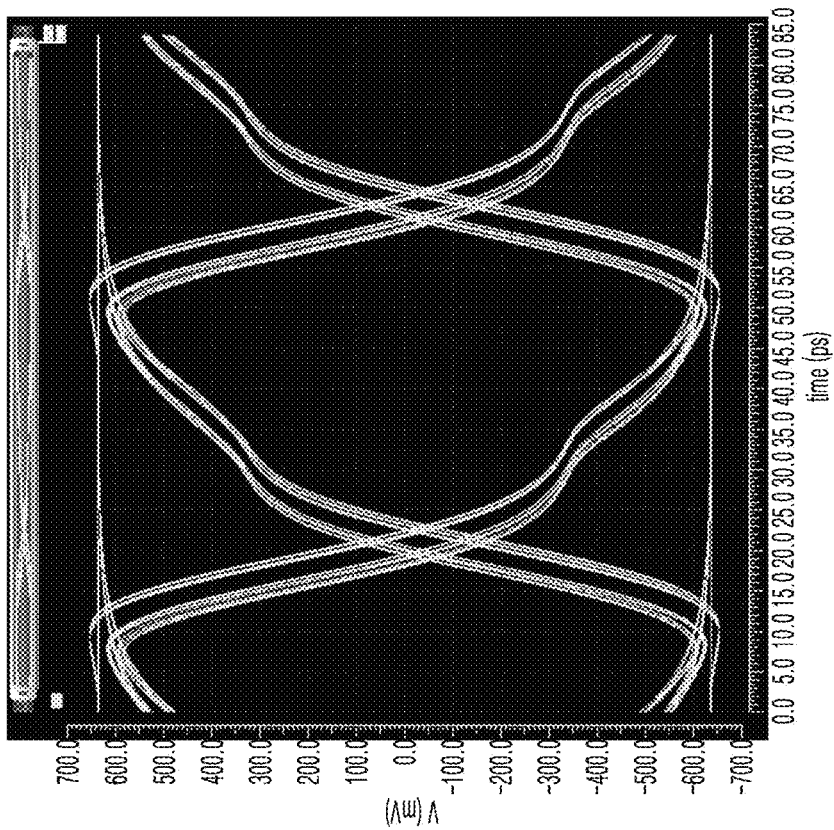
Figure 6B:
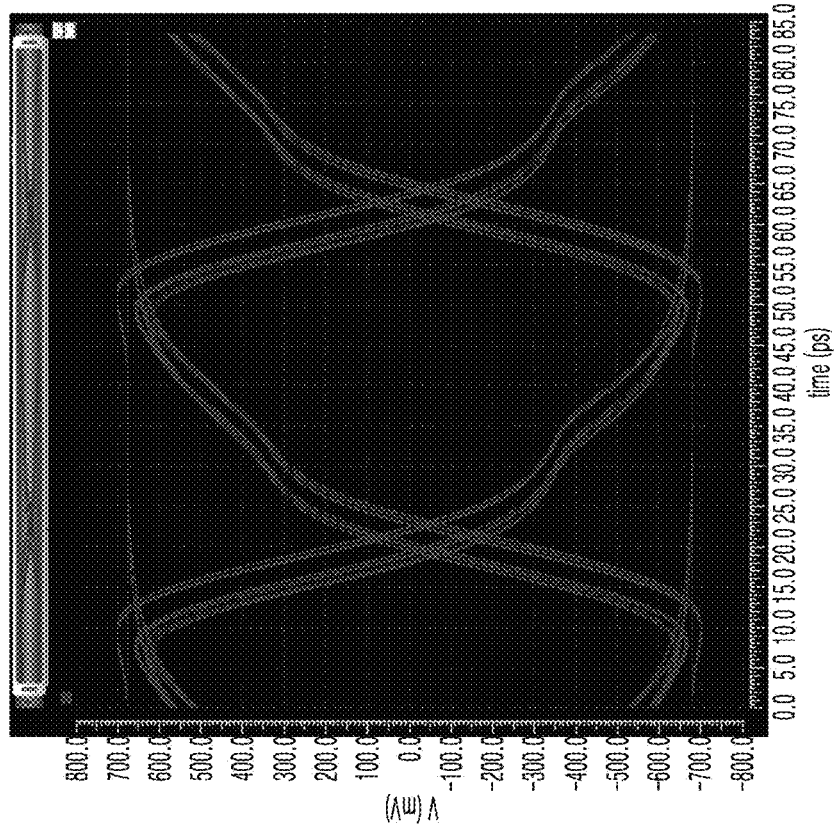

FIGS. 6A-6B are simulation diagrams illustrating an enhancement of an eye opening due to the frac. FFE (160) in the serial loop back line, according to the embodiments as disclosed herein.

Referring to the FIG. 6A, consider a data rate of 28 Gbps and consider that in a first scenario, the frac. FFE (160) in the SLB path is disabled. At 1, the eye is not open due to multiple zero (0) transitions at the center. The line at the center indicates that a considerable number of data bits have been treated as zero transition when they are not 0. Therefore, the UI is 35.71 ps and eye width is 0. At 2, the frac. FFE (160) in the SLB path is enabled. It can be observed that there are well defined transitions between 0 and 1 with a reduction in amplitude of some of the lines. As a result, the eye opens (e.g., eye height increases) and also achieves an eye width of 26.64 ps. Therefore, the use of the frac. FFE (160) in the SLB path improves the eye opening, as shown at 2 in the FIG. 6A.

Referring to the FIG. 6B, consider the simulation used a design cross-section with parasitic estimates from 5 nm with a supply voltage of 680 mV at data rate of 24 Gbps. At 1, the frac. FFE (160) is disabled and hence the eye-width achieved is 31.8 ps. At 2, when the frac. FFE (160) in the SLB path is enabled, the eye-width achieved is 33.4 ps. Therefore, the introduction of the frac. FFE (160) in the SLB path enhances the eye opening of the wire-line transceiver (100) during the SLB testing. Also, in some embodiments, the frac. FFE (160) is implemented using just the invertor and the transmission gate, which makes the frac. FFE (160) even easier to use with enhanced functionality.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A wire-line transceiver for performing a serial loop back test, the wire-line transceiver comprising:
   an on-chip transmitter;
   an on-chip receiver; and
   a fractional feed forward equalizer circuit (fractional FFE circuit) in a serial loop back line path between the on-chip transmitter and the on-chip receiver, wherein the fractional FFE circuit is configured to:
   induce a delay of less than one symbol time of data, for enhancing an eye opening from the serial loop back line during the serial loop back test, compared to a situation where the fractional FFE circuit is not present or is not used.

2. The wire-line transceiver as claimed in claim 1, wherein the fractional FFE circuit comprises an inverter and a transmission gate.

3. The wire-line transceiver as claimed in claim 1, wherein the delay less than one symbol time enhances the eye opening from the serial loop back line by minimizing an Inter Symbol Interference (ISI).

4. The wire-line transceiver as claimed in claim 1, wherein the fractional FFE circuit is connected in parallel with a resistor of the serial loop back line.

5. The wire-line transceiver as claimed in claim 4, wherein the fractional FFE circuit is connected in series between two consecutive inverters of the serial loop back line.

6. A method for performing a serial loop back test in a wire-line transceiver, the method comprising:
   sending, by an on-chip transmitter of the wire-line transceiver, data to an on-chip receiver for performing the serial loop back test;
   inducing, by a fractional feed forward equalizer circuit (fractional FFE circuit) of the wire-line transceiver, a delay of less than one symbol time of data, thereby enhancing an eye opening from a serial loop back line during the serial loop back test compared to a situation where the fractional FFE circuit is not present or is not used; and
   performing, by the wire-line transceiver, the serial loop back test with the enhanced eye opening from the serial loop back line,
   wherein the fractional FFE circuit is located in a serial loop back line path between the on-chip transmitter and the on-chip receiver.

7. The method as claimed in claim 6, wherein the fractional FFE circuit comprises an inverter and a transmission gate.

8. The method as claimed in claim 6, wherein the delay within one symbol time enhances the eye opening from the serial loop back line by minimizing an Inter Symbol Interference (ISI).

9. The method as claimed in claim 6, wherein the fractional FFE circuit is connected in parallel with a resistor of the serial loop back line.

10. The wire-line transceiver as claimed in claim 9, wherein the fractional FFE circuit is connected in series between two consecutive inverters of the serial loop back line.

\* \* \* \* \*